(12) United States Patent
Tsai

(10) Patent No.: US 8,152,378 B2
(45) Date of Patent: Apr. 10, 2012

(54) AUTOMATIC-POSITIONING LINEAR GUIDE

(76) Inventor: Shu-Fu Tsai, Taichung (TW)

( * ) Notice: Subject to any disclaimer, the term of this patent is extended or adjusted under 35 U.S.C. 154(b) by 1017 days.

(21) Appl. No.: 12/150,361

(22) Filed: Apr. 28, 2008

(65) Prior Publication Data

US 2009/0268993 A1   Oct. 29, 2009

(51) Int. Cl.
*F16C 19/00* (2006.01)
(52) U.S. Cl. ............................ 384/57; 384/58
(58) Field of Classification Search ............ 384/50, 384/52, 53, 54, 55, 56, 57, 58, 59
See application file for complete search history.

(56) References Cited

U.S. PATENT DOCUMENTS

| | | | | |
|---|---|---|---|---|
| 4,520,733 A | * | 6/1985 | Willmann | 104/93 |
| 4,775,247 A | * | 10/1988 | Isert | 384/43 |
| 4,815,863 A | * | 3/1989 | Forster | 384/49 |
| 5,547,285 A | * | 8/1996 | Hutzel et al. | 384/15 |
| 5,735,214 A | * | 4/1998 | Tsuboi | 105/29.1 |
| 6,488,411 B2 | * | 12/2002 | Michioka et al. | 384/45 |
| 6,495,935 B1 | * | 12/2002 | Mishler | 310/12.04 |
| 2007/0189647 A1 | * | 8/2007 | Keller et al. | 384/57 |
| 2007/0230838 A1 | * | 10/2007 | Fulton | 384/57 |

* cited by examiner

*Primary Examiner* — James Pilkington
*Assistant Examiner* — Keith Minter
(74) *Attorney, Agent, or Firm* — Alan Kamrath; Kamrath IP Lawfirm, PA

(57) ABSTRACT

An automatic-positioning linear guide has a driven body combined with guiding rails at two sides of a stationary base via a plurality of rollers. Each of the rollers is composed of two bearings combined by an axial shaft and can be assembled with the corresponding guiding rail without an assembly error therebetween.

14 Claims, 11 Drawing Sheets

AUTOMATIC-POSITIONING LINEAR GUIDE

BACKGROUND OF THE INVENTION

1. Technical Field

The present invention relates to linear guides and, more particularly, to a linear guide having functions of automatic positioning, automatic assembly-error eliminating, and automatic accumulated-error eliminating.

2. Description of Related Art

A conventional roller linear guide, as shown in FIGS. 1, 2 and 3, primarily comprises a rail 10 and a driven body 15 that can move back and forth along the rail 10. Two sides of the driven body 15 are combined with two sides of the rail 10 through a plurality of rollers 16, which assist the driven body 15 in its linear movement with reduced friction as well as reduced noise and which smoothes the linear movement of the driven body 15.

Each of the rollers 16 of the driven body 15 has an integral outer bush 161 where an outer annular groove 162 is formed for receiving a corresponding side of the rail 10.

People who have ordinary skill in the art of linear guides would appreciate that smooth and steady linear movement of the driven body 15 is available only when each roller 16 and the rail 10 are mated with high accurateness. Such high accurateness can significantly raise the manufacturing costs of the rail 10 and the rollers 16. However, even if the rail 10 and the rollers 16 are formed with the anticipated accurateness, when both are later combined together, assembly errors happening therebetween cannot be fully averted, and such assembly errors can accumulate and cause an accumulated assembly error that adversely effect the operation of the linear guide.

To remedy the problems of the assembly errors and the accumulated assembly error, it has been proposed in the prior art to adjust a position of the axle of each roller 16 to make the outer annular groove 162 of its outer bush 161 accurately engage the rail 10, thereby eliminating possible assembly errors. In such a known approach, referring to FIGS. 1 to 3, each roller 16 is inlaid to a respective moving block 12, which is fastened to the driven body 15 by a set screw 13 and a bias screw 14. Therefore, by adjusting the bias screw 14, the moving block 12 can slant with respect to the set screw 13 to shift the axle of the roller 16 and in turn improve the closeness between the moving block 12 and the rail 10. Consequently, the risk of assembly errors can be eliminated.

However, while each roller 16 is adjusted with respect to the rail 10 one by one, the following problems emerge. That is, the closeness between each roller 16 and the rail 10 may not be identical, and a resulted inequality of mating statuses tends to cause partial variation on the structural tension of the driven body 15, leading to deformation of the driven body 15. In addition, the discrepancy of the mating statuses between the rollers 16 and the rail 10 renders a discrepancy on the outer bushes 161 of the rollers 16. Consequently, after a period of use, the assembly errors and accumulated assembly error can become aggravated, and the driven body 15 will be subject to undesirable jolts during its linear movement.

Besides, since the rollers and rail 10 are assembled relying on manual operation without objective adjustment reference, in the event that the rollers 16 and the rail 10 are combined with undue closeness, the friction therebetween is increased and adversely affects the smooth linear movement of the driven body 15. Besides, the undue friction can significantly reduce the service lives of the rollers 16 and the rail 10.

SUMMARY OF THE INVENTION

One objective of the present invention is to provide an automatic-positioning linear guide having a driven body combined with two guiding rails settled at two sides of a stationary base, with each roller automatically adjusting a closeness where it is combined with the corresponding guiding rail. In other words, the roller serves to automatically eliminate an assembly error between itself and the corresponding guiding rail and in turn eliminate an accumulated assembly error, thereby achieving a highly precise assembly of the linear guide. It is to be noted that commercially available and ordinary bearings are competent to function as the rollers of the present invention, instead of any component made through special technology or highly precise standards.

Another objective of the present invention is to provide an automatic-positioning linear guide having a driven body combined with two guiding rails settled at two sides of a stationary base via a plurality of rollers. The driven body adjusts a lateral pressure thereof and in turn changes lateral pressures that a plurality of rollers applies to the guiding rails to automatically eliminate assembly errors and an accumulated assembly error between the rollers and the guiding rails, so that the rollers and the guiding rails can be assembled with proper closeness.

Another objective of the present invention is to provide an automatic-positioning linear guide, which facilitates preventing deformation of a driven body, ensuring stable movement of the driven body, protecting rollers and guiding rails from bearing an excessive lateral pressure, averting undue attrition of the rollers and the guiding members, and lengthening service lives of the rollers and the guiding rails.

Another objective of the present invention is to provide an automatic-positioning linear guide, which can be configured so that the linear guide has an arbitrary linear length. Thus, preparation as well as assembly of the linear guide are convenient, and linear precision as well as smooth movement are ensured.

To achieve the above objectives, the automatic-positioning linear guide comprises a stationary base and a driven body mounted thereon. Two parallel guiding rail sets are provided on a top surface of the stationary base. Each said guiding rail set comprises a pair of guiding rails of a round-rod shape that are arranged abreast. A bottom surface of the driven body is combined with the guiding rails via a plurality of rollers. Each said roller is composed of two bearings combined by an axial shaft. When reaching the corresponding guiding rail, the two bearings perform a bias with respect to an axial direction thereof so that the roller and the guiding rail are closely fitted without an assembly error therebetween. The guiding rail set further comprises a first seat and a second seat that are vertically aligned to sandwich the guiding rails therebetween.

BRIEF DESCRIPTION OF THE DRAWINGS

The invention, as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While a preferred embodiment is provided herein for illustrating the concept of the present invention as described above, it is to be understood that the extent of deformation or displacement of the components in these drawings are made for better explanation and need not to be made in scale.

Figure 2:
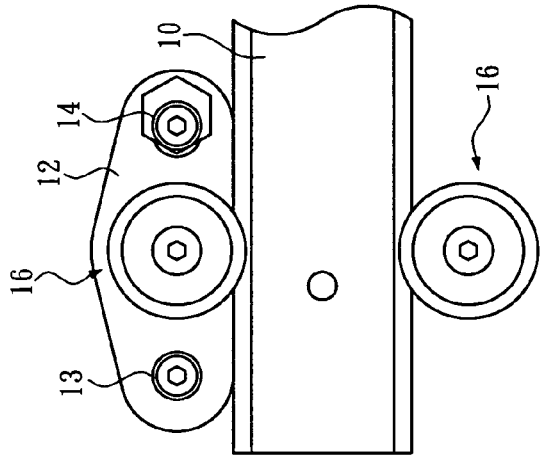
FIG. 2 is a partial bottom view of the linear guide of FIG. 1.
Figure 3:
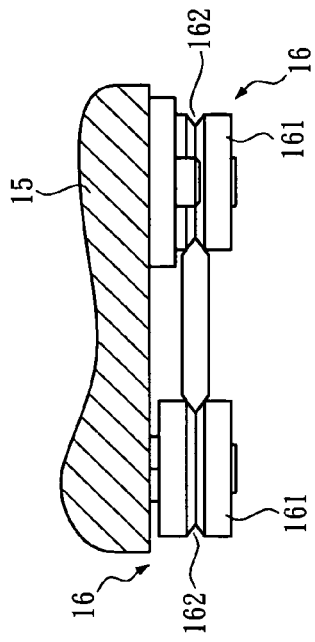
FIG. 3 is a lateral view of the linear guide of FIG. 2.
Figure 1:
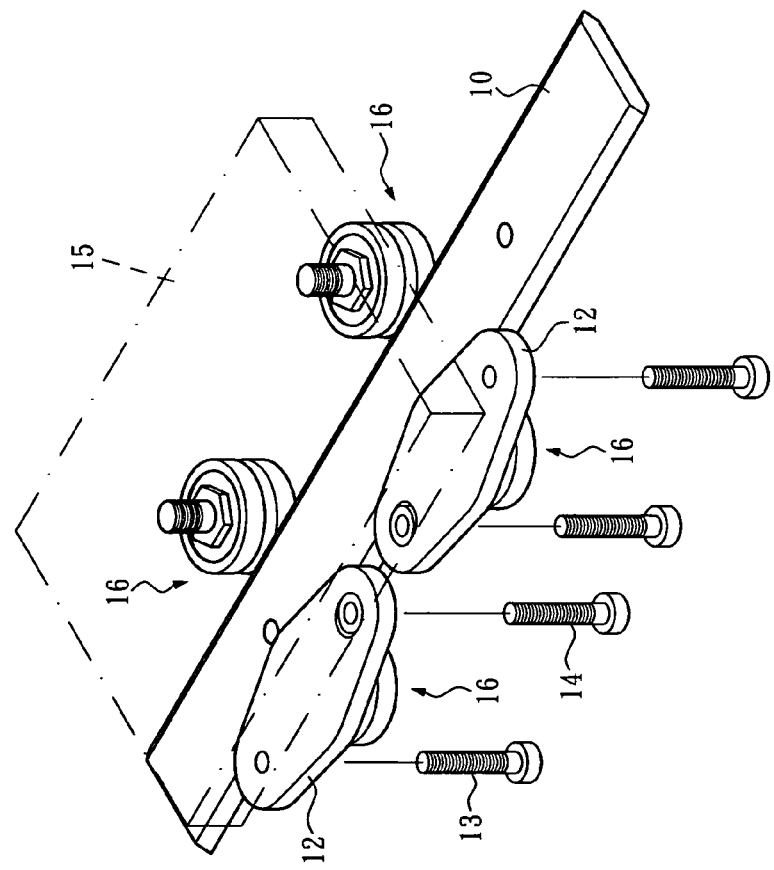
FIG. 1 is a partial perspective view of a conventional roller-type linear guide.
Figure 4:
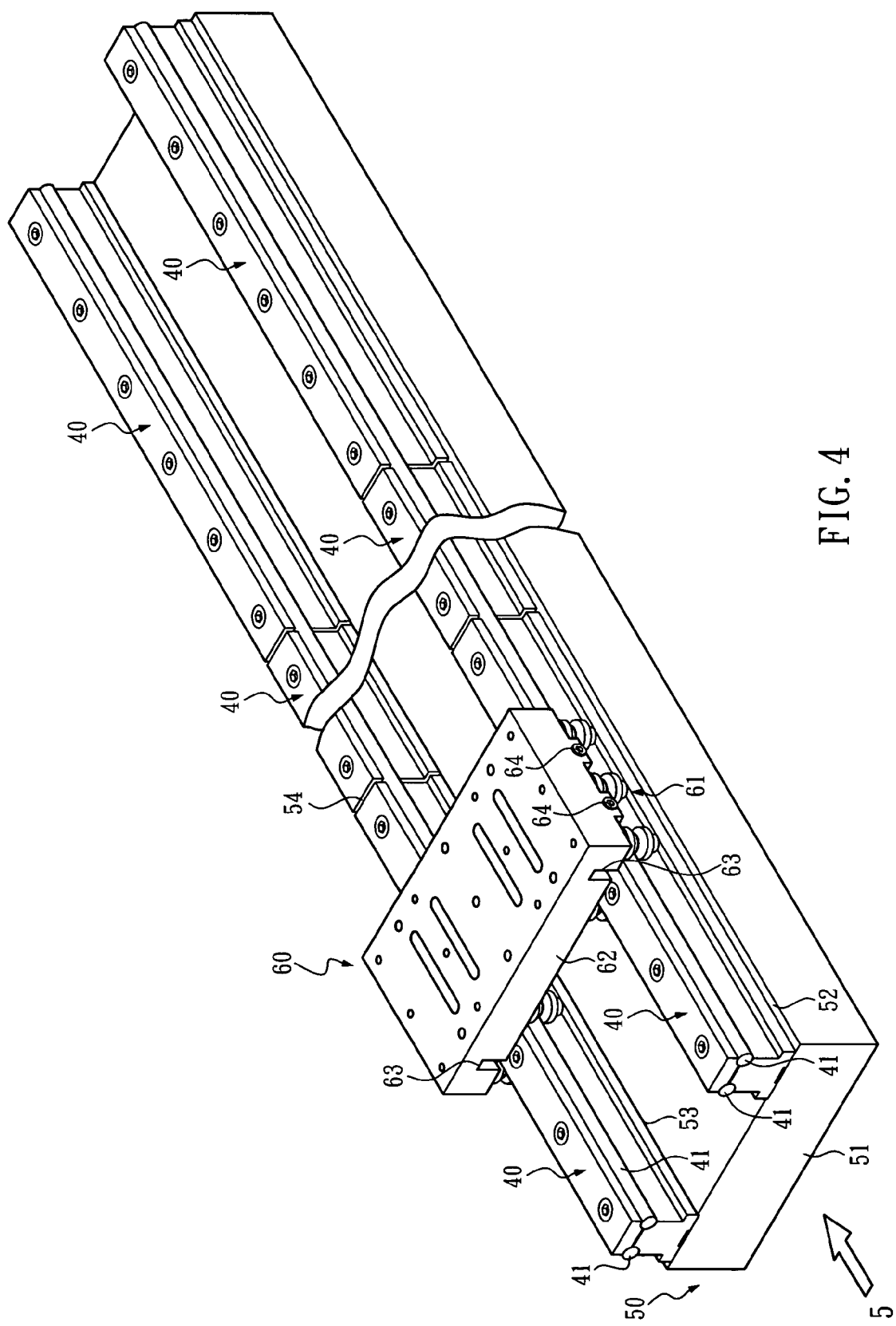
FIG. 4 is a perspective view of a linear guide of the present invention.
Figure 5:
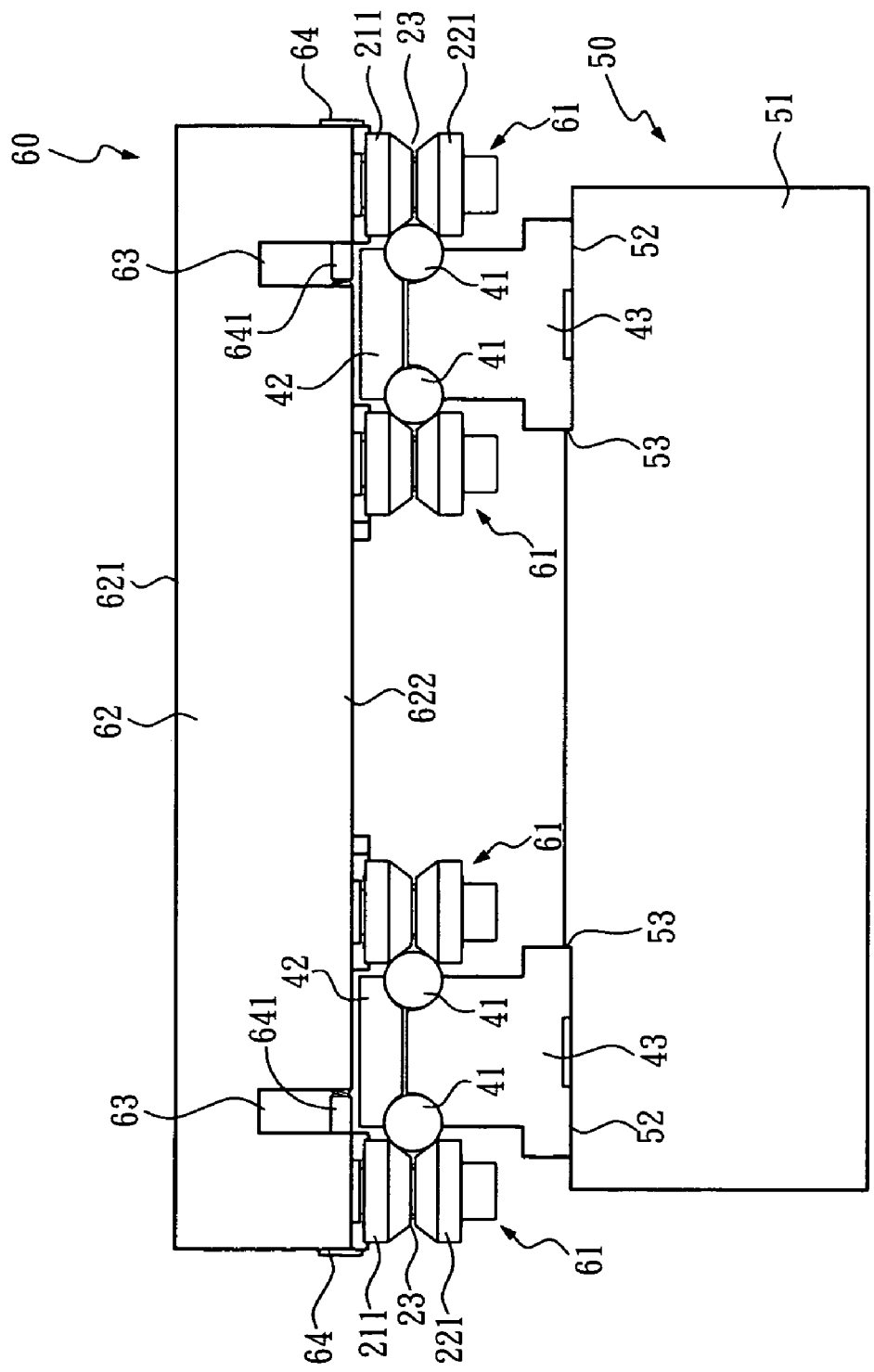
FIG. 5 is a plane drawing of the linear guide of the present invention made along a direction of Arrow 5 of FIG. 4.

As shown in FIGS. 4 and 5, the linear guide of the present invention comprises a stationary base 50 and a driven body 60. A pair of guiding rail sets 40 are provided at two sides of a top surface of the stationary base 50. The guiding rail set 40 at each side has a pair of guiding rails 41 settled abreast. At least one pair of rollers 61 are provided at two sides of a bottom surface of the driven body 60. The driven body 60 is mounted on the stationary base 50 so that each said roller 61 contacts an outer surface of the corresponding guiding rail 41.

Figure 6:
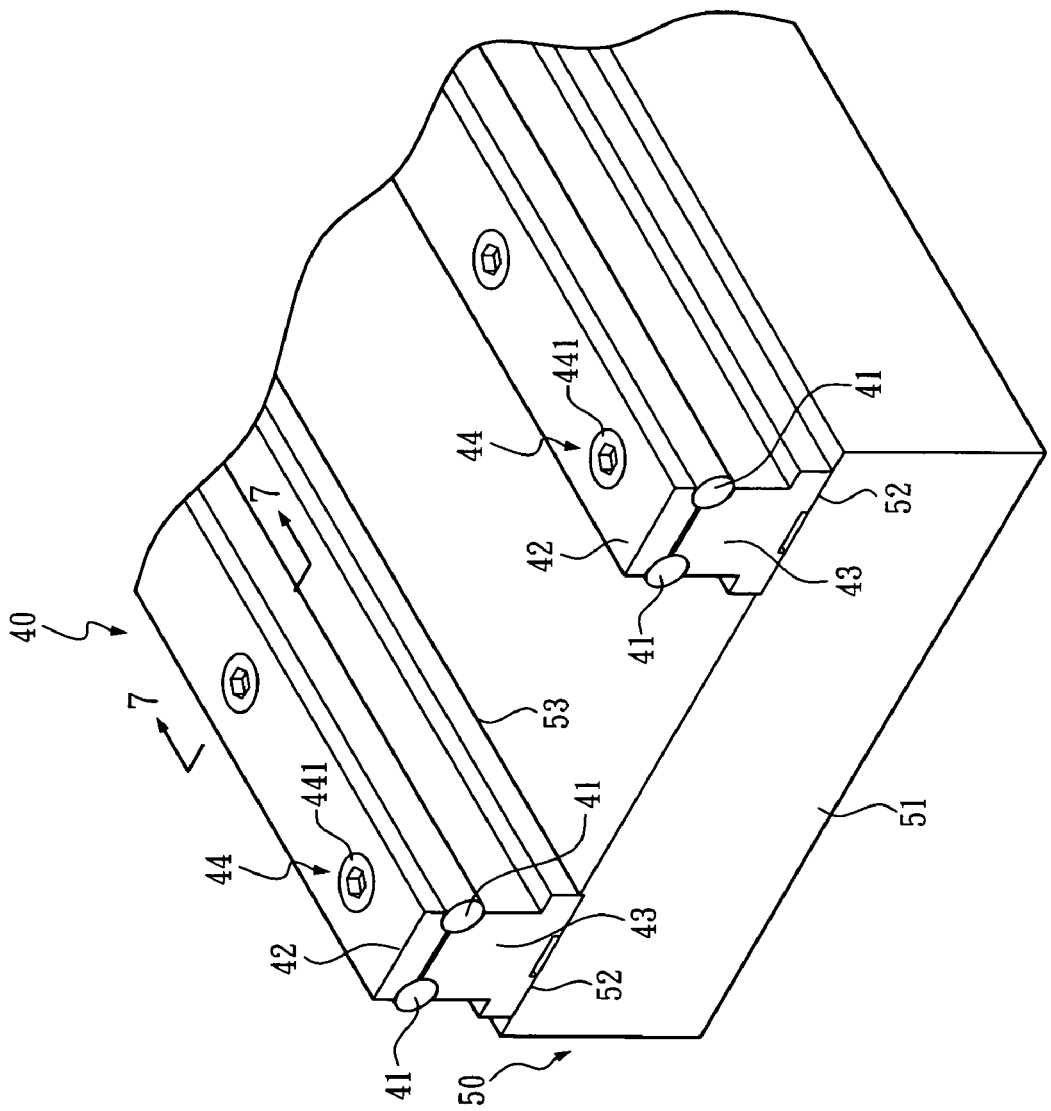
FIG. 6 is a partial perspective view of a stationary base of the linear guide of the present invention.
Figure 8:
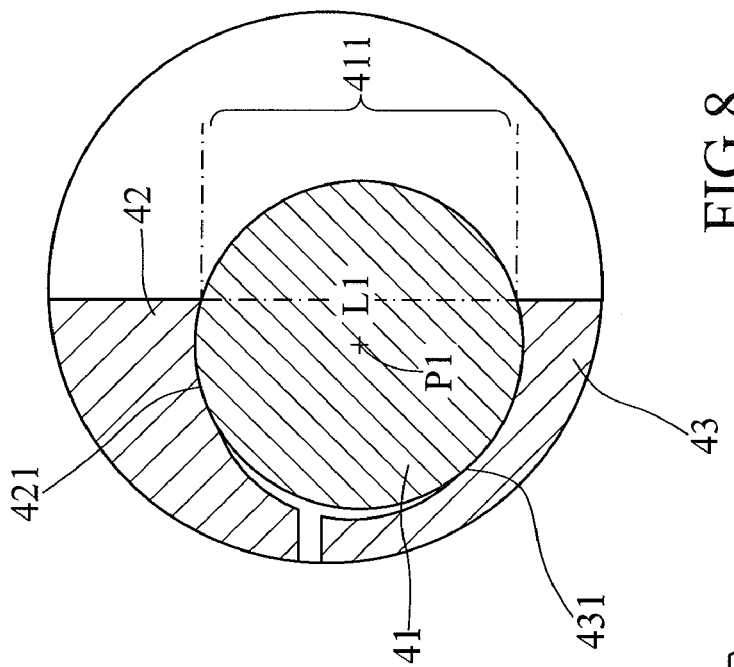
FIG. 8 is a partially enlarged view of the circle in FIG. 7.
Figure 7:
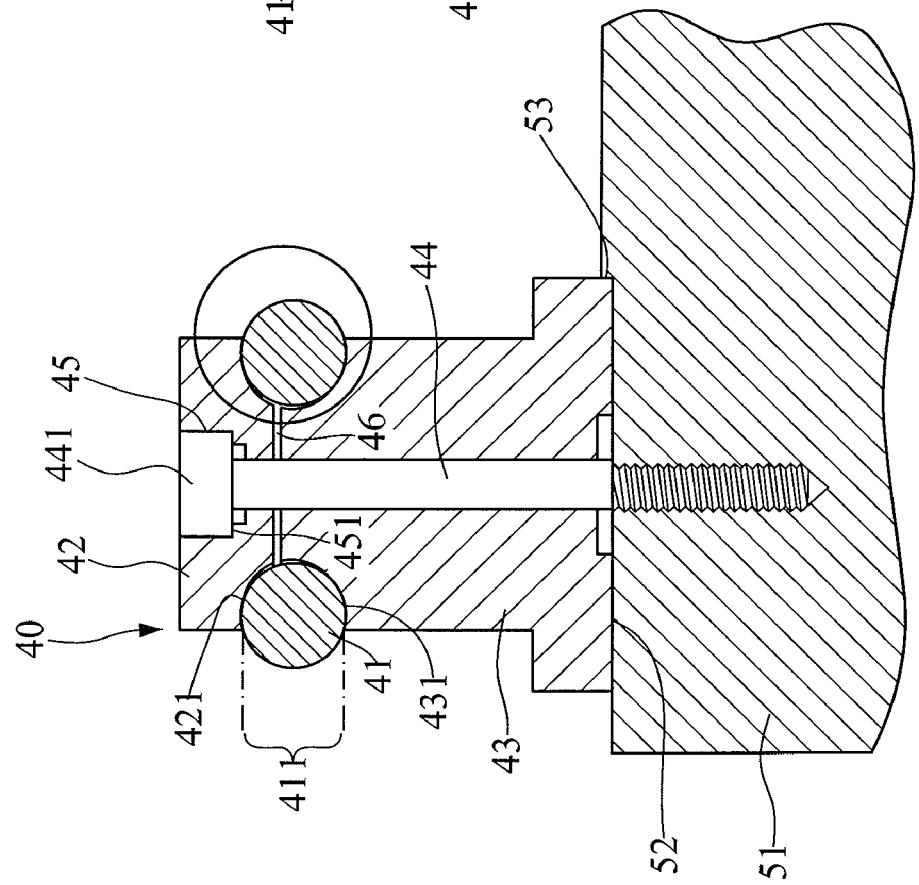
FIG. 7 is a partial sectional view made along line 7-7 of FIG. 6, showing guiding assemblies.

In FIGS. 6, 7 and 8, the stationary base 50 of the present invention comprises a base 51. A pair of fixing portions 52 are provided along two sides of a top surface thereof. The fixing portions 52 are depressed from the top surface of the base 51 so that a retaining edge 53 is formed at a point where the top surface of the base 51 and each fixing portion 52 meet. The guiding rail set 40 comprises a first seat 42 and a second seat 43 that are vertically aligned. A plurality of bolts 44 pierce through the first and second seats 42, 43 to combine both and further fix the second seat 43 on the fixing portion 52. A rail receiving portion 421 or 431 formed as a quarter round is provided at each of two sides of the first seat 42 or the second seat 43 so that adjacent rail receiving portions 421, 431 jointly define a semicircular accommodating space for receiving one guiding rail 41 that has a round-rod shape. When the bolts 44 are screwed downward, the first seat 42 is pressed downward so that the rail receiving portions 421, 431 jointly clamp and position each guiding rail 41 at a surface thereof. A roller contacting portion 411 of the guiding rail 41 is juts out laterally of the first seat 42 and the second seat 43 for being combined with the rollers 61. In the drawings, a supposititious straight line L1 fits in with the first seat 42 and the second seat 43, and it can be observed that a center P1 of the guiding rail 41 is inside the suppositious straight line L1, namely the rail receiving portions 421, 431, retaining more than 180 peripheral degrees of the guiding rail 41 to prevent the guiding rail 41 from coming off and to firmly position the guiding rail 41 between the first seat 42 and the second seat 43.

Besides, a relative distance 46 exists between the first seat 42 and the second seat 43 for fully transmitting a fastening pressure from the bolts 44 exerting on the first seat 42 to the guiding rail 41. If there is no relative distance between the first seat 42 and the second seat 43, the fastening pressure from the bolts 44 would be weakened due to a direct contact of the first seat 42 and the second seat 43, and the guiding rail 41 can not be firmly positioned. A socket 45 is provided at the top surface of the first seat 42 for receiving a head 441 of the bolt 44. When the bolt 44 is screwed to the end, the head 441 gives a pressing force to a bottom 451 of the socket 45 so that the first seat 42 is pressed downward to constrict the guiding rail 41. By using the bottom 451 of the socket 45 to receive the pressure of the bolt 44, the top surface of the first seat 42 can be free from being pressed to deform.

Each guiding rail set 40 has a bottom of the second seat 43 thereof abutting against the retaining edge 53 of the base 51 of the stationary base 50. Thereupon, linear precision of the retaining edge 53 promises that an axis of the corresponding guiding rail set 40 is parallel to the retaining edge 53. As a result, linear precision of the two guiding rails 41 at the two sides of the guiding rail set 40 can be also ensured and, thereby, the rollers 61 of the driven body 60 can smoothly slide along the guiding rails 41 without standstill.

By linking up the guiding rail sets 40 and the base 51, respectively, the stationary base 50 of any desired length is possible. In FIG. 4, two adjacent guiding rail sets 40 at the same side of the base 51 are spaced by an extension gap 54. The extension gap 54 provides a tolerance for possible thermal volume change to the guiding rail sets 40 so that the guiding rail sets 40 and the guiding rails 41 can be prevented from deforming due to thermal expansion generated under high-speed sliding of the driven body 60.

Figure 9:
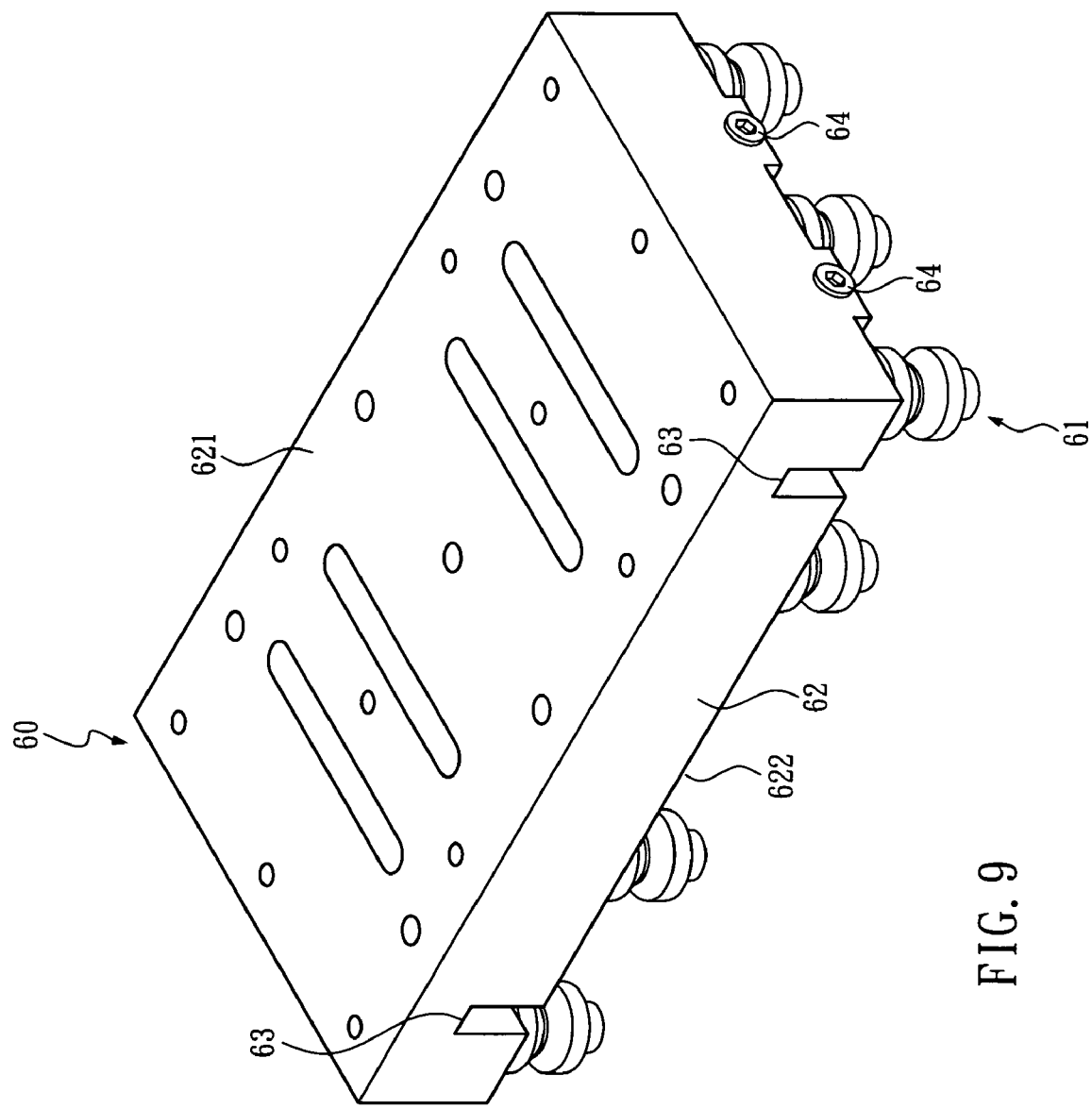
FIG. 9 is a top view of the driven body of the linear guide according to the present invention.
Figure 10:
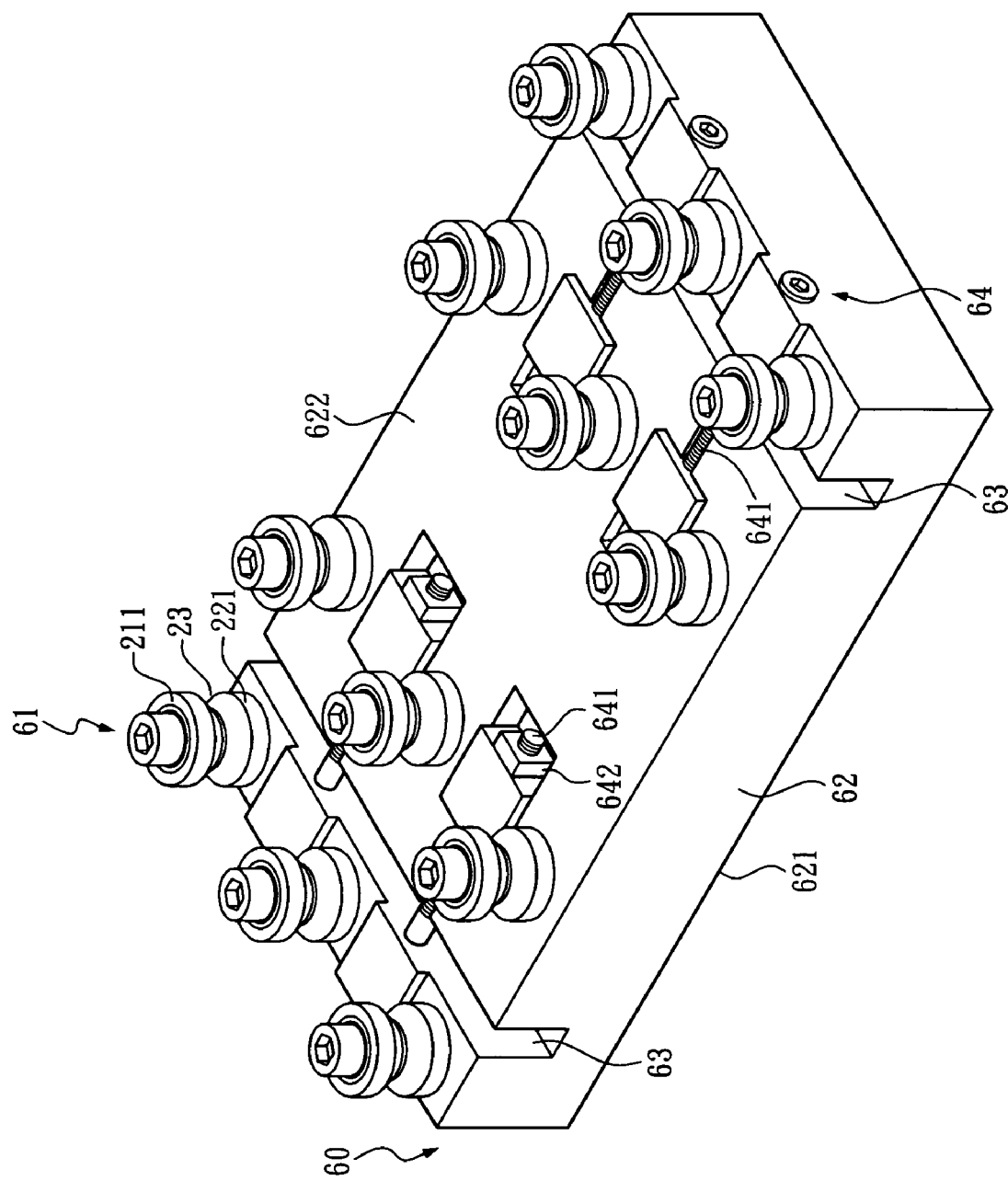
FIG. 10 is a bottom view of the driven body of the linear guide according to the present invention.
Figure 15:
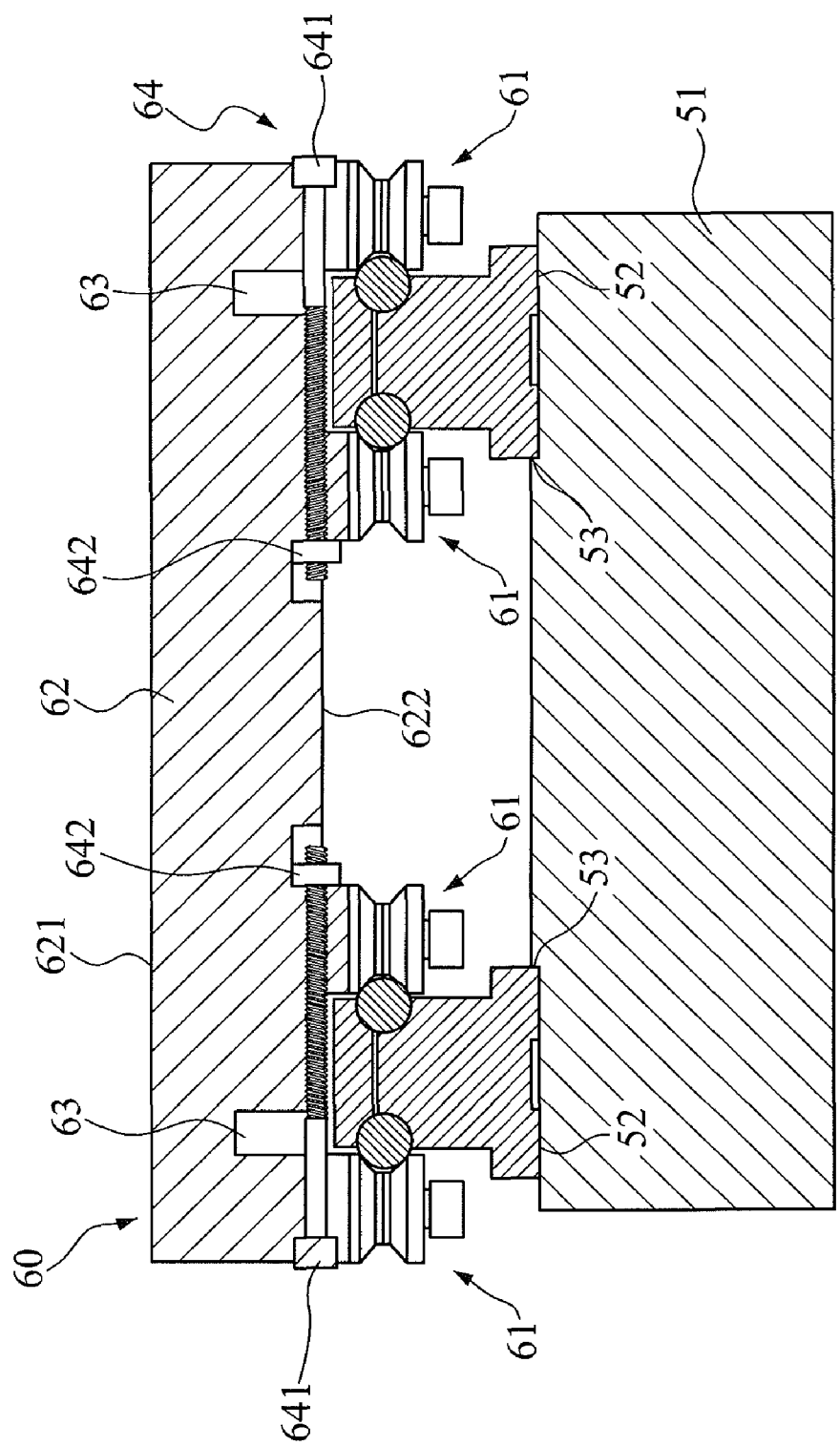
FIG. 15 is a sectional assembly drawing of the linear guide according to the present invention.

As shown in FIGS. 9, 10 and 15, the driven body 60 comprises a body 62. A top surface 621 of the body 62 functions as a receiving surface. Two rows of said rollers 61 are provided at each of two sides of a bottom surface 622 of the body 62. A groove 63 is formed on the bottom surface 622 of the body 62 between the two rows of rollers 61 at the same side. At least two lateral pressure adjusting members 64 are abreast, are provided at each of the two sides of the body 62 and perpendicularly cross the corresponding groove 63. Each lateral pressure adjusting member 64 may comprise a bolt 641 and a nut 642. By rotating the bolt 641 clockwise or anti-clockwise, a constriction force from the two banks of the groove 63 can be adjusted. When the driven body 60 is mounted on the stationary base 50, each roller 61 contacts the corresponding roller contacting portion 411 of the guiding rail 41. At this time, rotating the bolt 641 clockwise or anti-clockwise to change the constriction force from the banks of the grooves 63 serves to change the lateral pressure that the rollers 61 exert on the guiding rails 41. As a result, the rollers 61 and the guiding rails 41 are closely combined without assembly errors therebetween. Furthermore, since the driven body 60 is combined with the guiding rails 41 with symmetrical pressures at its two sides, it is protected from deforming.

Figure 12:
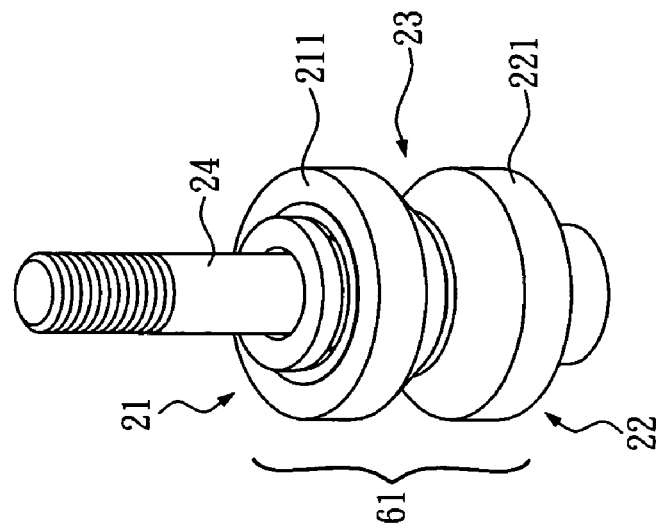
FIG. 12 is an assembly drawing of the roller according to the present invention.
Figure 11:
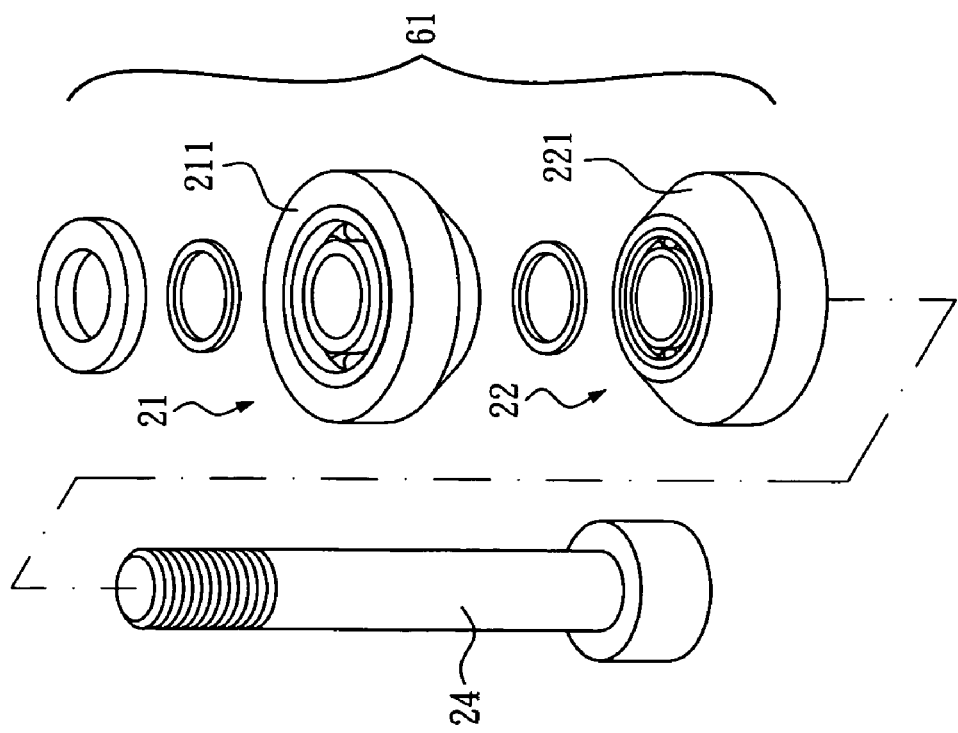
FIG. 11 is an exploded view of the roller according to the present invention.
Figure 13:
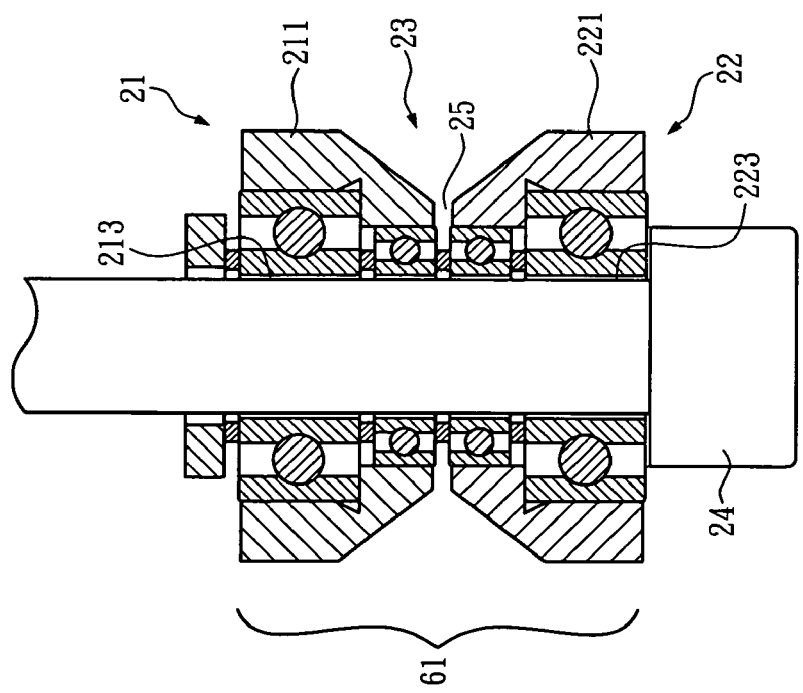
FIG. 13 is a sectional assembly drawing of the roller according to the present invention.

In FIGS. 11, 12 and 13, the roller 61 is composed of two bearings 21, 22 lined by an axial shaft 24 so that the bearings 21, 22 have centers thereof contacted mutually. Outer bushes 211 and 221 of the bearings 21, 22 jointly define an annular sliding groove 23. A relative interval 25 exists between the two bearings 21, 22. The bearings 21, 22 are respectively spaced from the axial shaft 24 with another relative interval 213 or 223. Thereby, when receiving a lateral force, the bearings 21, 22 can perform a bias change with respect to an axial direction thereof. The axial shaft 24 may be a bolt for not only linking the bearings 21, 22 but also fastening the bearings 21, 22 to the driven body 60. When the driven body 60 slides along the guiding rails 41, the bearings can rotate about the axial shaft 24 and smooth the movement of the driven body 60.

Figure 14:
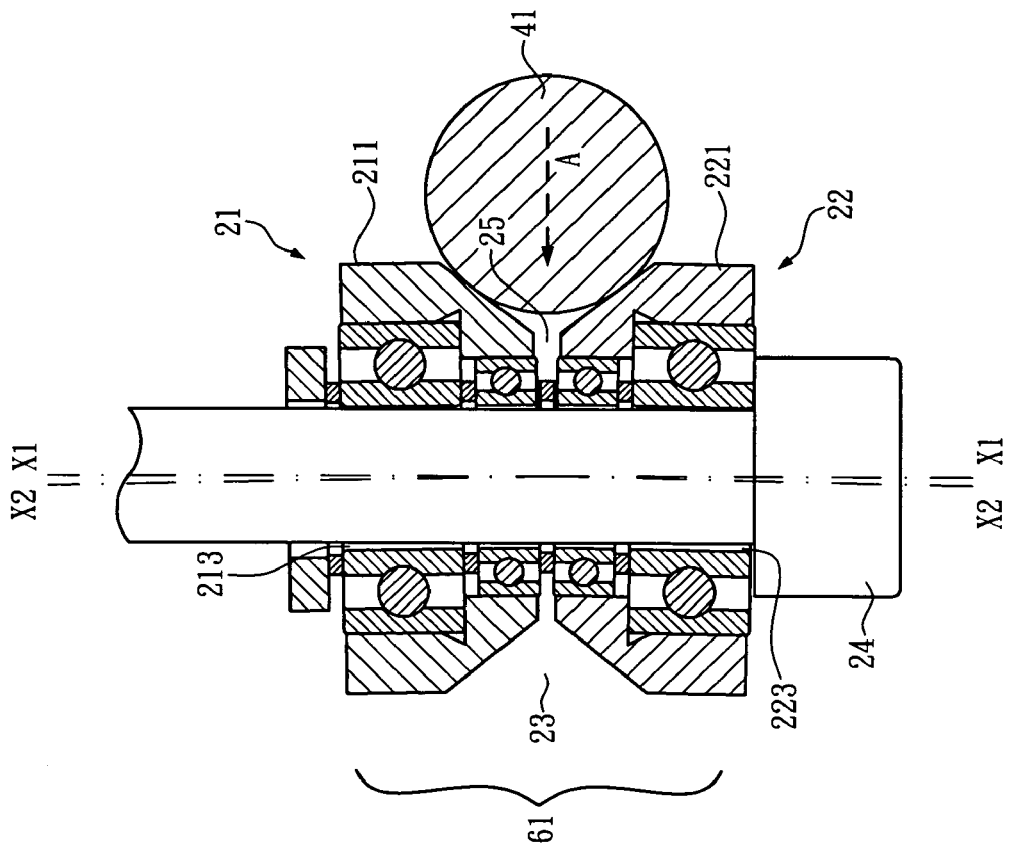
FIG. 14 is a sectional view of the assembled roller and guiding rail according to the present invention.

In FIG. 14, the guiding rail 41 closely fits the sliding groove 23 and brings a lateral force perpendicular to an axis line X1 of the two bearings 21, 22 as indicated by Arrow A. The two bearings 21, 22 use the relative intervals 25, 213, 223 to perform biases with respect to the axis of the bearings 21, 22 along the force. That is, without the presence of the lateral force, the axis of the bearings 21, 22 coincides with the axis of the axial shaft 24 (Line X1), and with the presence of the lateral force, the axis of the bearings 21, 22 is deflected to a position as indicated by Line X2. It is to be noted that the depicted Line X2 is just for illustration and not a limitation to the deflection of the axis of the bearings 21, 22. The deflection may be of any extent within a certain angular range and is automatically determined by the mating status between the bearings 21, 22 and the guiding rails 41. The deflection of the bearings 21, 22 helps the rollers to automatically adjust closeness to the corresponding guiding rail 41. Each roller 61 can automatically eliminate an assembly error between itself and the guiding rail 41 and, in turn, eliminate an accumulated assembly error of the overall linear guide to achieve a high preciseness of the linear guide.

Figure 16:
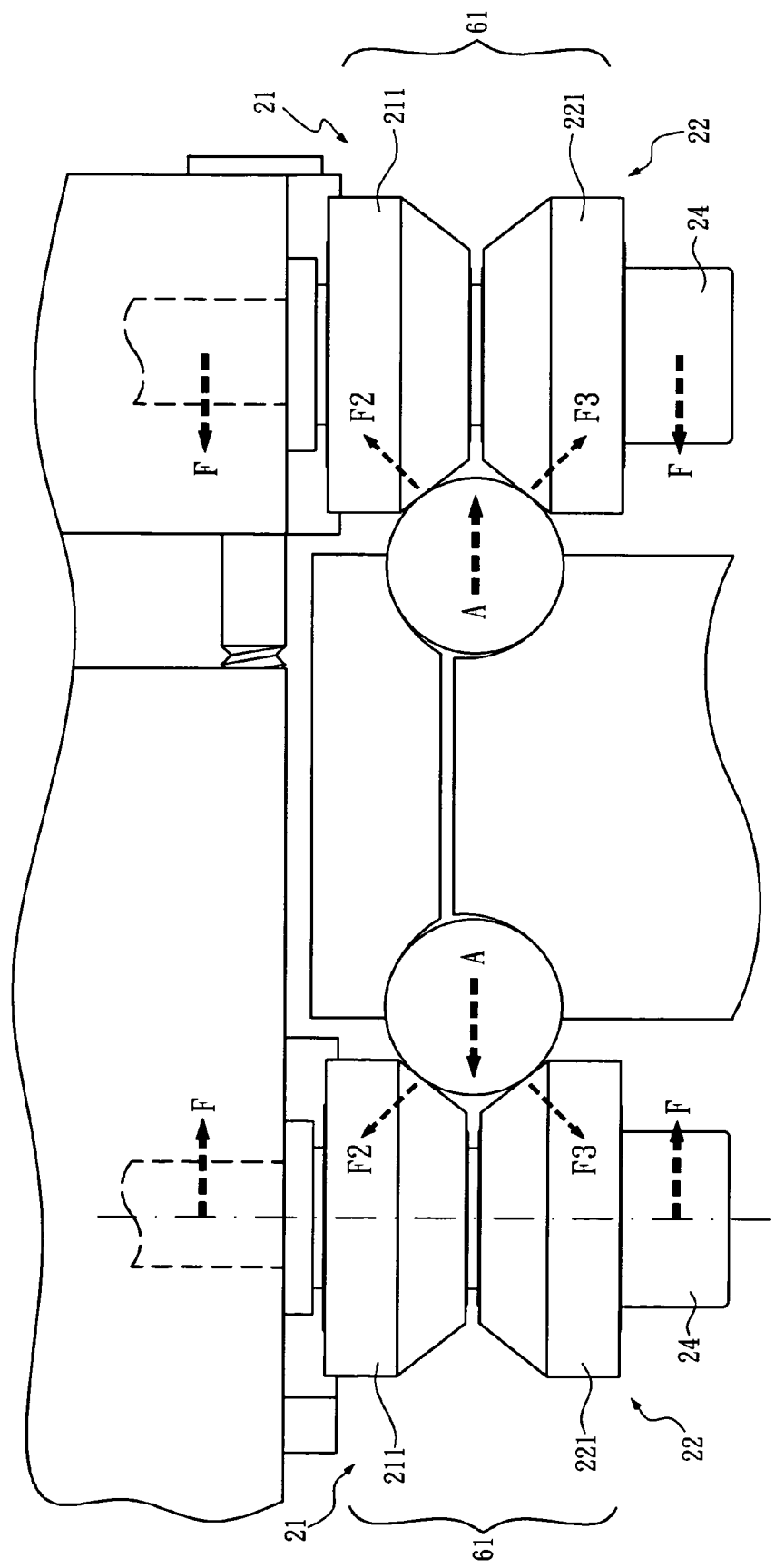
FIG. 16 is a schematic drawing showing a direction of a force generated when the rollers and the guiding rails are combined.

In FIG. 16, a force distribution between the assembled rollers 61 and guiding rails 41 is provided. As described above, by rotating the lateral pressure adjusting members 64 of FIG. 15, the constriction force from the two banks of the groove 63 can be changed. When the constriction forces F act on the axial shafts 24 of the rollers 61, the rollers 61 bring the lateral pressure of the corresponding level to the guiding rails 41. Then, counterforces A from the guiding rails 41 can be transmitted to the bearings 21, 22 through points where they contact mutually, as indicated by Arrows F2 and F3. Since the bearings 21, 22 can deflect, the counterforces F2 and F3 can incline the bearings 21, 22 as shown in FIG. 14.

Although the particular embodiment of the invention has been described in detail for purposes of illustration, it will be understood by one of ordinary skill in the art that numerous variations will be possible to the disclosed embodiments without going outside the scope of the invention as disclosed in the claims.

What is claimed is:

1. An automatic-positioning linear guide comprising:
a stationary base having a pair of guiding rail sets provided at two lengthwise sides of a top surface thereof, wherein each guiding rail set has at least one guiding rail provided at one lengthwise lateral side of each guiding rail set and the at least one guiding rail has a roller contacting portion laterally jutting out of each guiding rail set;
a driven body mounted on the stationary base, wherein at least one roller is provided at each of two sides of a bottom surface of the driven body and each at least one roller comprises two bearings and an axial shaft combining and fastening the two bearings to the driven body, wherein two outer bushes of the two bearings jointly define an annular sliding groove at an exterior of the at least one roller to receive the roller contacting portion of the guiding rail, whereby when the two outer bushes of the two bearings contact the roller contacting portions, an axis of the two bearings deflects;
at least one groove formed on the bottom surface of the driven body between the at least one roller provided at each of the two sides of the driven body; and
at least one lateral pressure adjusting member provided parallel to the two sides of the driven body and perpendicularly crossing the at least one groove.

2. The automatic-positioning linear guide of claim 1, further comprising:
a pair of fixing portions along the two lengthwise sides of the top surface of the stationary base; and
a retaining edge formed at a point where the stationary base and each fixing portion meet allowing the guiding rail set to be fixed at the fixing portion along the retaining edge.

3. The automatic-positioning linear guide of claim 2, wherein the fixing portion is depressed from the top surface of the stationary base with an altitudinal difference between the fixing portion and the top surface of the stationary base defining the retaining edge at the point where the top surface of the stationary base and the fixing portion meet.

4. The automatic-positioning linear guide of claim 1, wherein the guiding rail set comprises a first seat and a second seat vertically aligned and a plurality of bolts passing through and fastening the first seat and the second seat to the stationary base, wherein the at least one guiding rail has a portion thereof other than the roller contacting portion retained between the first and second seats.

5. The automatic-positioning linear guide of claim 4, wherein a socket is provided at a top surface of the first seat for receiving a head of each bolt.

6. The automatic-positioning linear guide of claim 4, wherein a rail receiving portion formed as a quarter round is provided at each of two sides of the first seat and the second seat facing each other, wherein adjacent rail receiving portions jointly define a semicircular accommodating space for receiving one said guiding rail, and wherein the one said guiding rail has a portion thereof other than the roller contacting portion received in the semicircular accommodating space and retained between the first and second seats.

7. The automatic-positioning linear guide of claim 4, wherein a relative distance exists between the first seat and the second seat.

8. The automatic-positioning linear guide of claim 1, wherein a relative interval exists between the two bearings while the two bearings are respectively separated from the axial shaft for another relative interval.

9. The automatic-positioning linear guide of claim 1, wherein the axial shaft is a bolt.

10. The automatic-positioning linear guide of claim 1, further comprising another pair of guiding rail sets linked up at each of the two lengthwise sides of the stationary base, wherein adjacent guiding rail sets are spaced an extension gap.

11. The automatic-positioning linear guide of claim 1, wherein the at least one lateral pressure adjusting member comprises a bolt passing across the at least one groove and a nut fixed to the bottom surface of the driven body for receiving the bolt.

12. The automatic-positioning linear guide of claim 1, wherein two rows of said rollers are provided at each of the two sides of the bottom surface of the driven body, wherein each guiding rail set has a pair of guiding rails settled at each of the two lengthwise sides, whereby when the roller contacting portions of the pair of guiding rails combined with the annular sliding grooves of the rollers, the outer bushes of each roller contact the corresponding roller contacting portion.

13. An automatic-positioning linear guide comprising:
a stationary base having a pair of guiding rail sets provided at two lengthwise sides of a top surface thereof, wherein each guiding rail set has at least one guiding rail provided at one lengthwise lateral side of each guiding rail set and the at least one guiding rail has a roller contacting portion laterally jutting out of each guiding rail set; and a driven body mounted on the stationary base, wherein at least one roller is provided at each of two sides of a bottom surface of the driven body and each at least one roller comprises two bearings and an axial shaft combining and fastening the two bearings to the driven body, wherein two outer bushes of the two bearings jointly define an annular sliding groove at an exterior of the at least one roller to receive the roller contacting portion of the guiding rail, whereby when the two outer bushes of the two bearings contact the roller contacting portions, an axis of the two bearings deflects, wherein two rows of said rollers are provided at each of the two sides of the bottom surface of the driven body, wherein each guiding rail set has a pair of guiding rails settled at each of the two lengthwise sides, whereby when the roller contacting portions of the pair of guiding rails combined with the annular sliding grooves of the rollers, the outer bushes of each roller contact the corresponding roller contacting portion, wherein a groove is formed on the bottom surface of the driven body between the two rows of said rollers and a plurality of lateral pressure adjusting members are provided on the driven body and perpendicularly cross the groove.

14. The automatic-positioning linear guide of claim 13, wherein a lateral pressure adjusting member is provided on the driven body between two adjacent rollers of the same row of rollers.

* * * * *